(12) United States Patent
Kato et al.

(10) Patent No.: US 6,188,829 B1
(45) Date of Patent: Feb. 13, 2001

(54) DATA REPRODUCTION APPARATUS FOR CHARACTER MULTIPLEXING VIDEO SIGNAL

(75) Inventors: Koji Kato, Tokyo; Masayuki Watanabe, Yokohama, both of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/015,072

(22) Filed: Jan. 28, 1998

(30) Foreign Application Priority Data

Jan. 29, 1997 (JP) ..................................... 9-015301

(51) Int. Cl.[7] .................. H04N 5/76; H04N 7/00
(52) U.S. Cl. ................. 386/46; 386/94; 348/461; 348/465
(58) Field of Search .................... 386/1, 45, 46, 386/95, 125–126, 83; 348/461, 465, 467, 468, 473, 474; H04N 5/76, 5/92, 9/79, 7/00, 7/08

(56) References Cited

U.S. PATENT DOCUMENTS

| | | | |
|---|---|---|---|
| 4,277,838 | * | 7/1981 | Chambers ........................ 348/465 |
| 6,046,775 | * | 4/2000 | Jonnalagadda et al. ............ 348/461 |
| 6,111,612 | * | 8/2000 | Ozkan et al. ..................... 348/465 |

FOREIGN PATENT DOCUMENTS 2 188 816   10/1987   (GB).

* cited by examiner

Primary Examiner—Thai Tran
(74) Attorney, Agent, or Firm—Oblon, Spivak, McClelland, Maier & Neustadt, P.C.

(57) ABSTRACT

A data reproduction apparatus for character multiplexing video signal includes an A/D converter circuit for converting a character multiplexing video signal into a digital video signal, an FC detecting/clock generating circuit for detecting an FC signal contained in the digital video signal to generate a clock signal for character data reproduction, a delay circuit for delaying the digital video signal by a period of time corresponding to time required for the FC detecting/clock generating circuit to generate the clock signal, and a data reproducing circuit for reproducing character data by sampling the digital video signal which is time-adjusted by the delay circuit by use of the clock signal.

13 Claims, 8 Drawing Sheets

DATA REPRODUCTION APPARATUS FOR CHARACTER MULTIPLEXING VIDEO SIGNAL

BACKGROUND OF THE INVENTION

This invention relates to a data reproduction apparatus for reproducing character data from a character multiplexing video signal which is demodulated from a received signal of character multiplexing television broadcast, and more particularly to an apparatus for generating a clock signal for character data reproduction based on a character data identification sync signal attached to a character multiplexing video signal and reproducing character data based on the clock signal, and the apparatus is used for a television receiver or video tape player, for example.

The character multiplexing video signal contains character information in the form of character data or font data in the vertical scanning period of the video signal, and in a period prior to the character data, a bit sync signal called a CRI (Clock Run In) signal and a byte sync signal called an FC (framing code) signal are sequentially attached as the character data identification sync signal.

In the specification of the character multiplexing video signal, the CRI signal is 16 pulse signals (pulse signals of 8 cycles) having a pattern of "1010101010101010" and the FC signal is 8 pulse signals having a pattern of "11100100". The pulse period (frequency) of the CRI signal is determined according to the type of the specification.

Conventionally, in a data reproduction apparatus for character multiplexing video signal, the CRI signal in the character multiplexing video signal is detected to generate a clock signal for character data reproduction and the character data is reproduced based on the clock signal.

However, the CRI signal which conforms with the specification is not always contained in a video signal input of a video signal input terminal 10 even at the time of reception of the character multiplexing television broadcast according to the conditions of countries or regions giving the character multiplexing television broadcast and, for example, the period of the CRI signal is short or part of the pulse of the CRI signal is lost in some cases.

In such a case, in the conventional data reproducing apparatus, the CRI signal cannot be stably detected and a clock signal for character data reproduction cannot be stably generated, and as a result, character data cannot be stably reproduced in some cases.

Therefore, for example, when an equipment containing a data reproduction apparatus for character multiplexing video signal for export specification is manufactured, it is necessary to recheck whether a system for generating a clock signal for character data reproduction based on the CRI signal can be used or not.

As described above, the data reproduction apparatus for character multiplexing video signal has a problem that a clock signal for character data reproduction cannot be stably generated in some cases according to the conditions of the countries or regions giving the character multiplexing television broadcast, and therefore, character data cannot be stably reproduced in some cases.

BRIEF SUMMARY OF THE INVENTION

An object of this invention is to provide a data reproduction apparatus for character multiplexing video signal which can stably generate a clock signal for character data reproduction and stably reproduce character data without receiving a substantial influence by the conditions of the countries or regions giving the character multiplexing television broadcast.

This invention provides a data reproduction apparatus for character multiplexing video signal which includes an A/D converter circuit for converting a character multiplexing video signal into a digital video signal; a framing code detecting/clock generating circuit for receiving the digital video signal from the A/D converter circuit and detecting a framing code signal contained in the received signal to generate a clock signal for character data reproduction; a delay circuit for delaying the digital video signal input from the A/D converter circuit by a period of time corresponding to time required for the framing code detecting/clock generating circuit to generate the clock signal; and a data reproducing circuit for reproducing character data by sampling the digital video signal delayed by the delay circuit by use of the clock signal generated from the framing code detecting/clock generating circuit.

This invention provides a data reproduction apparatus for character multiplexing video signal comprising an A/D converter circuit for converting a character multiplexing video signal into a digital video signal; a framing code detecting/clock generating circuit for receiving the digital video signal from the A/D converter circuit and detecting a framing code signal contained in the received signal to generate a clock signal for character data reproduction; a delay circuit for delaying the digital video signal input from the A/D converter circuit by a period of time corresponding to time required for the framing code detecting/clock generating circuit to generate the clock signal; and a data reproducing circuit for reproducing character data by sampling the digital video signal delayed by the delay circuit in synchronism with the clock signal generated from the framing code detecting/clock generating circuit, the framing code detecting/clock generating circuit includes a clock generating circuit for generating plural-phase clock signals of at least three phases each having a frequency twice the bit rate of data contained in the digital video signal; a plurality of framing code detection circuits for detecting framing code signals from the digital video signal and outputting the amplitude levels of the framing signals in synchronism with the respective plural-phase clock signals; a maximum level series determination circuit for determining the magnitude relation between the amplitude levels output from the plurality of framing code detection circuits and outputting different logic levels for one of a plurality of series in which the input has the highest level and the framing code detection frequency is highest and the other series; and a clock selection circuit for receiving outputs of the plurality of framing code detection circuits and outputs of plural series from the maximum level series determination circuit and outputting a clock signal of one of the plural series corresponding to the plural-phase clock signals of the clock generating circuit in which the framing code detection frequency is highest as a data reproduction clock.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described embodiments of this invention with reference to the accompanying drawings. A data reproduction apparatus for character multiplexing video signal according to this invention detects a framing code signal or FC signal in the character multiplexing video signal to generate a clock signal for character data reproduction and reproduces character data based on the clock signal.

Figure 1:
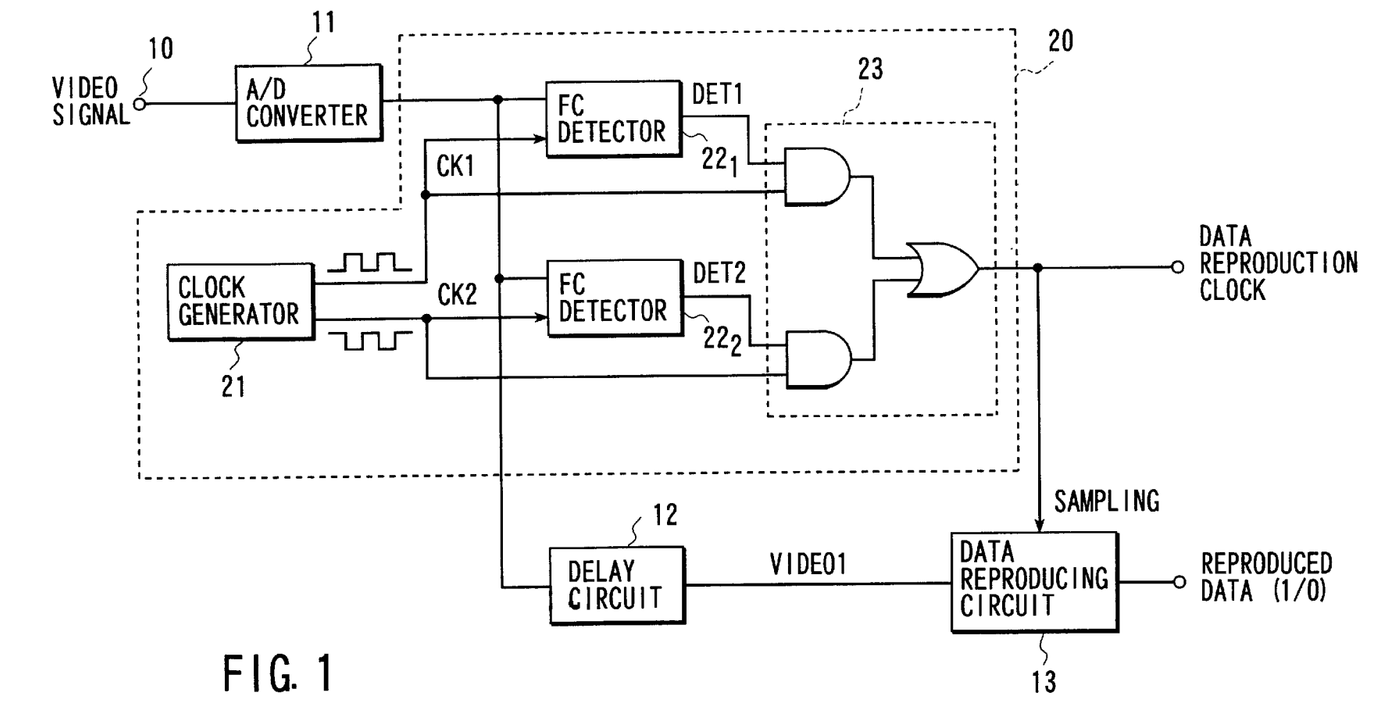
FIG. 1 is a block diagram showing a data reproduction apparatus for character multiplexing video signal according to a first embodiment of this invention.

According to the data reproduction apparatus for character multiplexing video signal according to the first embodiment of this invention shown in FIG. 1, a video signal is branched from a video signal system in a television receiver, for example, and input to a video signal input terminal 10. When the character multiplexing television broadcast is received, the character multiplexing video signal is received by the video signal input terminal 10, but when a normal television broadcast is received, a normal video signal is input to the terminal 10.

The input video signal is subjected to A/D conversion by an A/D (analog/digital) converter 11 and an A/D converted output (digital video signal) thereof is input to an FC detecting/clock generating circuit 20 and a delay circuit 12.

The FC detecting/clock generating circuit 20 detects an FC signal from the input television signal and generates a clock signal for character data reproduction. The delay circuit 12 delays the digital video signal by a preset period of time corresponding to time required for the FC detecting/clock generating circuit 20 to generate the clock signal (that is, it adjusts the time).

A data reproducing circuit 13 reproduces character data by sampling the digital video signal output from the delay circuit 12 in synchronism with the clock signal generated by the FC detecting/clock generating circuit 20. A circuit (not shown) disposed at the succeeding stage of the data reproducing circuit 13 performs a desired process for reproduced character data (reproduced data).

Next, the FC detecting/clock generating circuit 20 is explained in detail. The FC detecting/clock generating circuit 20 includes a clock generator 21, two FC detection circuits $22_1$ and $22_2$ which are operated in synchronism with the clock signals from the clock generator 21, and a clock selection circuit 23.

The clock generator 21 generates two-phase clock signals which have a frequency twice the bit rate of data and are asynchronous with respect to the phase of the data, that is, a first clock signal CK1 and second clock signal CK2 which are set in the opposite phase.

Figure 2:
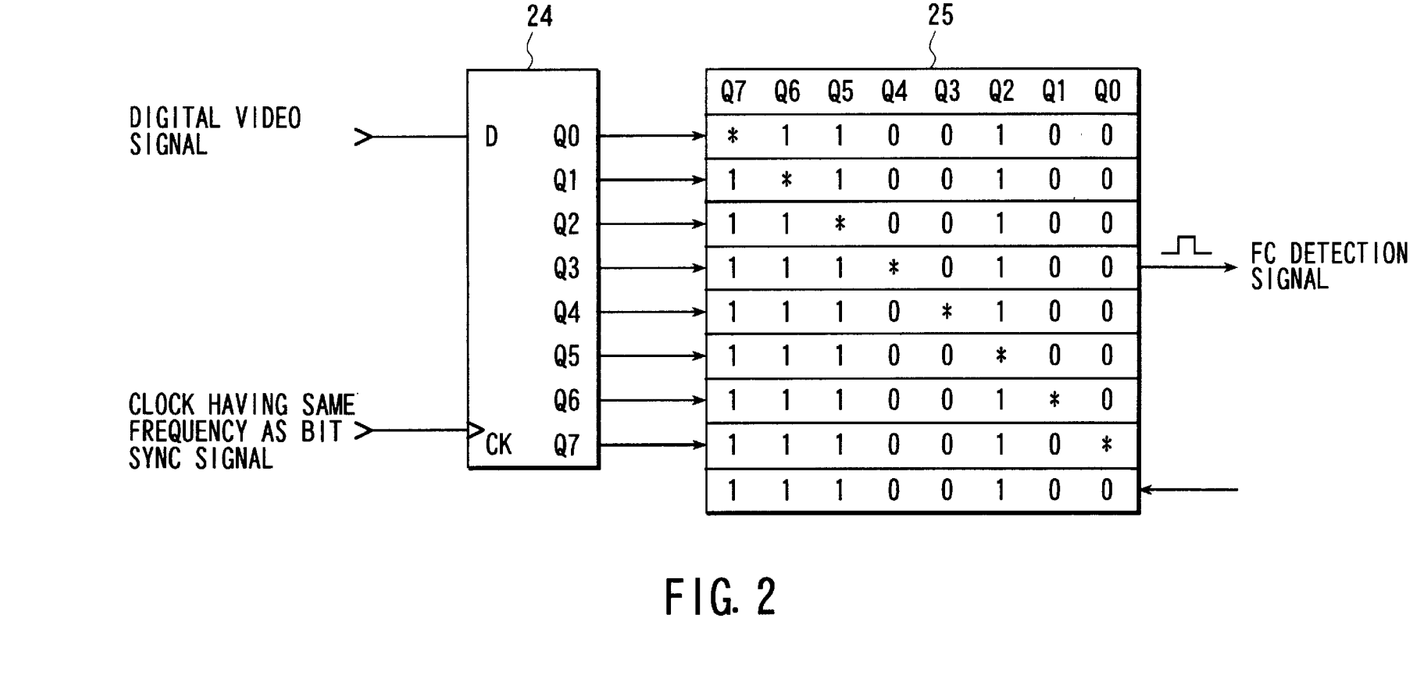
FIG. 2 is a block diagram of an FC detection circuit used in the data reproduction apparatus of this invention.

Each of the two FC detection circuits $22_1$ and $22_2$ detects an FC signal (8 pulse signals having a pattern of "11100100") contained in the input digital video signal. In a concrete example, it includes a serial/parallel converter 24 for fetching an input digital video signal in synchronism with the clock signal having the same frequency as the bit sync signal as shown in FIG. 2 and subjecting the video signal to serial/parallel conversion and a decoder circuit 25 for outputting the result of determination of an "H/L" level, for example, according to whether or not the pattern of the parallel conversion signal of the serial/parallel converter 24 coincides with the reference patterns of the FC signal as shown in FIG. 2. In other words, in the decoder circuit 25 of FIG. 2, eight reference patterns (lost bits are indicated by *) in which any one bit in the outputs $Q_0$ to $Q_7$ of the serial/parallel converter 24 is lost and a complete reference pattern having no lost bit are shown. Even if one bit of the parallel signals $Q_0$ to $Q_7$ is thus lost, the decoder circuit 25 detects the bit-lost parallel signal as the FC signal when it compares the parallel signal with the reference patterns of the FC signal and then outputs an FC detection signal.

Since the two-phase clock signals CK1 and CK2 respectively supplied to the FC detection circuits $22_1$ and $22_2$ are opposite-phase clock signals, one of outputs DET1 and DET2 of the two FC detection circuits $22_1$ and $22_2$ is set to the "H" level, for example, when one of the FC detection circuits $22_1$ and $22_2$ first detects the FC signal contained in the input digital video signal and the other FC detection circuit outputs an "L" level signal.

The operations of the FC detection circuits are explained with reference to the timing chart of FIG. 3. The FC detection circuits $22_1$ and $22_2$ fetch the FC signals in response to the rises of the clocks CK1 and CK2. In FIG. 2, a state in which the last bit of the FC signal is fetched in response to the rise of the clock CK1 is shown. Since, at this time, the clock CK2 falls, the FC signal is not fetched in response to the clock CK2. That is, the FC detection circuit $22_1$ fetches the FC signal before the FC detection circuit $22_2$ fetches the FC signal and the FC detection circuit $22_1$ outputs the FC detection signal DET1. The FC detection circuits $22_1$ and $22_2$ may be designed to fetch the FC signals in response to the falls of the respective clock signals.

The clock selection circuit 23 is constructed by a combination of logic circuits such as AND gates and OR gates to select one of the two-phase clock signals CK1 and CK2 output from the clock generator 21 which corresponds to the detected FC signal (for example, which is the clock CK1 in the case of FIG. 2) according to the FC signal detection results output from the two FC detection circuits $22_1$ and $22_2$, and output the selected clock signal as a data reproduction clock.

Figure 3:
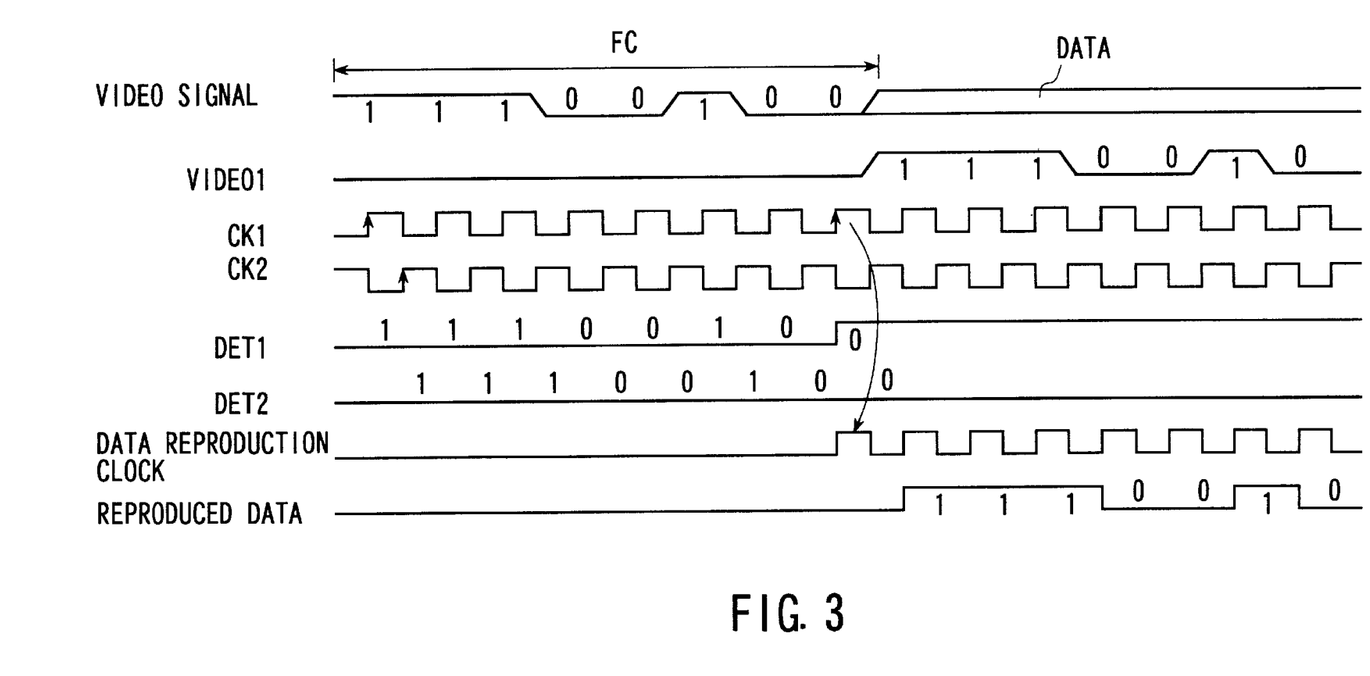
FIG. 3 is a timing waveform diagram for illustrating the operation of the data reproduction apparatus of FIG. 1.

The data reproducing circuit 13 outputs reproduced data in synchronism with the clock signal output from the clock selection circuit 23 as shown in FIG. 3.

According to the data reproduction apparatus according to the first embodiment, even in a case where the CRI signal which conforms with the specification is not contained in the video signal even at the time of reception of the character multiplexing television broadcast according to the conditions (such as the specification attainment standard of the broadcast station or the propagating condition of broadcast waves) of countries or regions giving the character multiplexing television broadcast, the FC signal can be stably detected, a clock signal for character data reproduction can be stably generated and character data can be stably reproduced only if the FC signal which conforms with the specification is contained in the input video signal.

Therefore, for example, in a case where an equipment containing a data reproduction apparatus for character multiplexing video signal for export specification is manufactured, it becomes possible to stably reproduce character data without receiving a substantial influence by the conditions of the countries or regions giving the character multiplexing television broadcast if the data reproducing apparatus according to the first embodiment is used.

Figure 4:
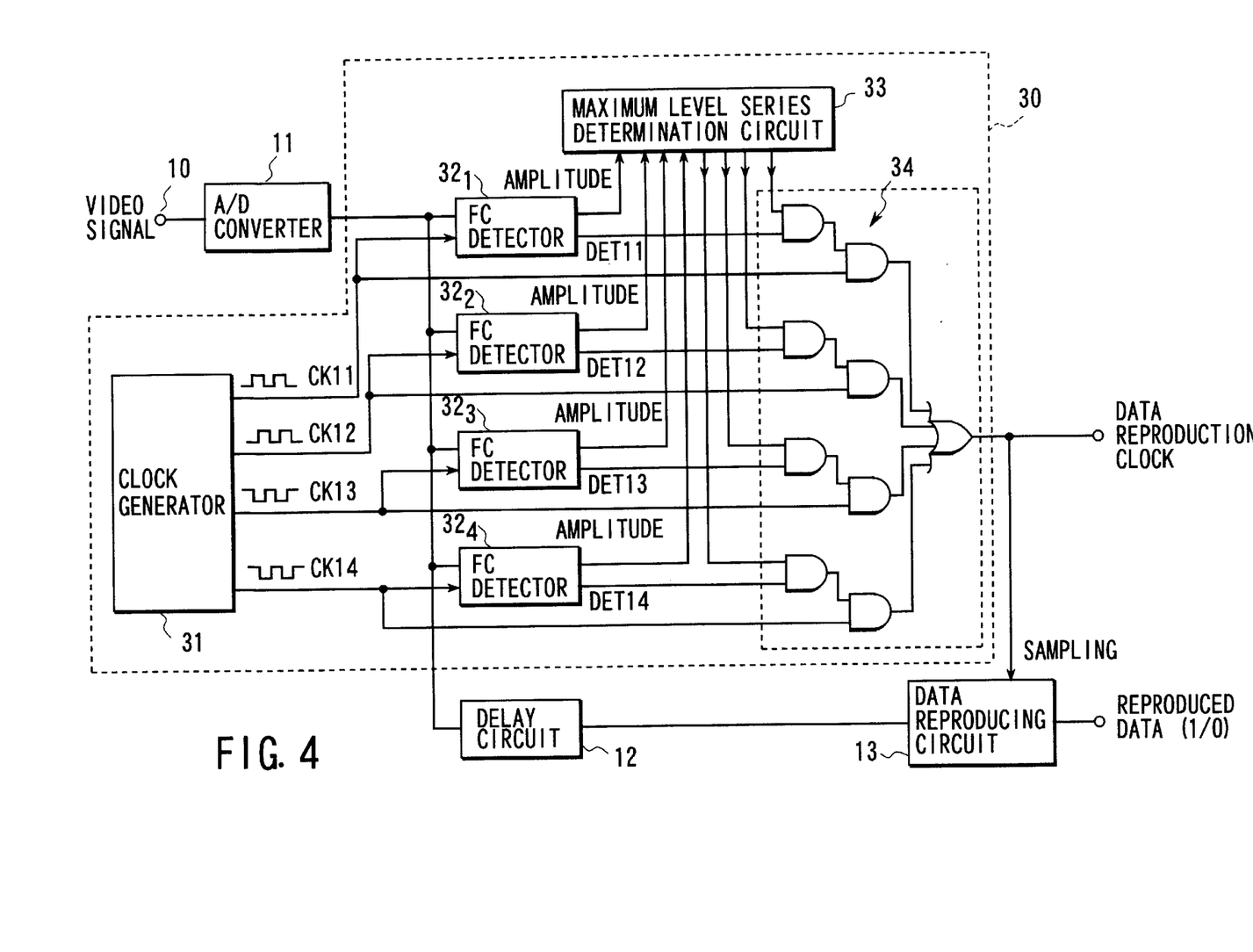
FIG. 4 is a block diagram showing a data reproduction apparatus for character multiplexing video signal according to a second embodiment of this invention.

FIG. 4 shows a data reproduction apparatus for character multiplexing video signal according to a second embodiment of this invention. The data reproduction apparatus shown in FIG. 4 is similar to the data reproduction apparatus shown in FIG. 1 except an FC detecting/clock generating circuit 30, and therefore, portions which are the same as those of FIG. 1 are denoted by the same reference numerals.

The FC detecting/clock generating circuit 30 includes a clock generator 31, a plurality of FC detection circuits $32_1$ to $32_4$, maximum level series determination circuit 33 and clock selection circuit 34.

The clock generator 31 generates clock signals of three or more phases which have a frequency twice the bit rate of data and are asynchronous with respect to the phase of the data, and in this embodiment, it generates first to fourth clock signals CK11 to CK14 whose phases are sequentially delayed by $\pi/2$.

Each of the first to fourth FC detection circuits $32_1$ to $32_4$ corresponding to the plurality of clock signals CK1 to CK14 detects an FC signal (eight pulses having a pattern of "11100100") contained in the input digital video signal.

For example, as shown in FIG. 2, each of the first to fourth FC detection circuits $32_1$ to $32_4$ includes a serial/parallel converter 24 for fetching an input digital video signal in synchronism with a corresponding one of the 4-phase clock signals CK11 to CK14 and subjects the fetched video signal to serial/parallel conversion, and a decoder circuit 25 for outputting the result of determination of "H/L" level, for example, according to whether or not a pattern of the parallel conversion signal from the serial/parallel converter 24 coincides with the reference patterns in the decoder circuit 25.

Figure 5:
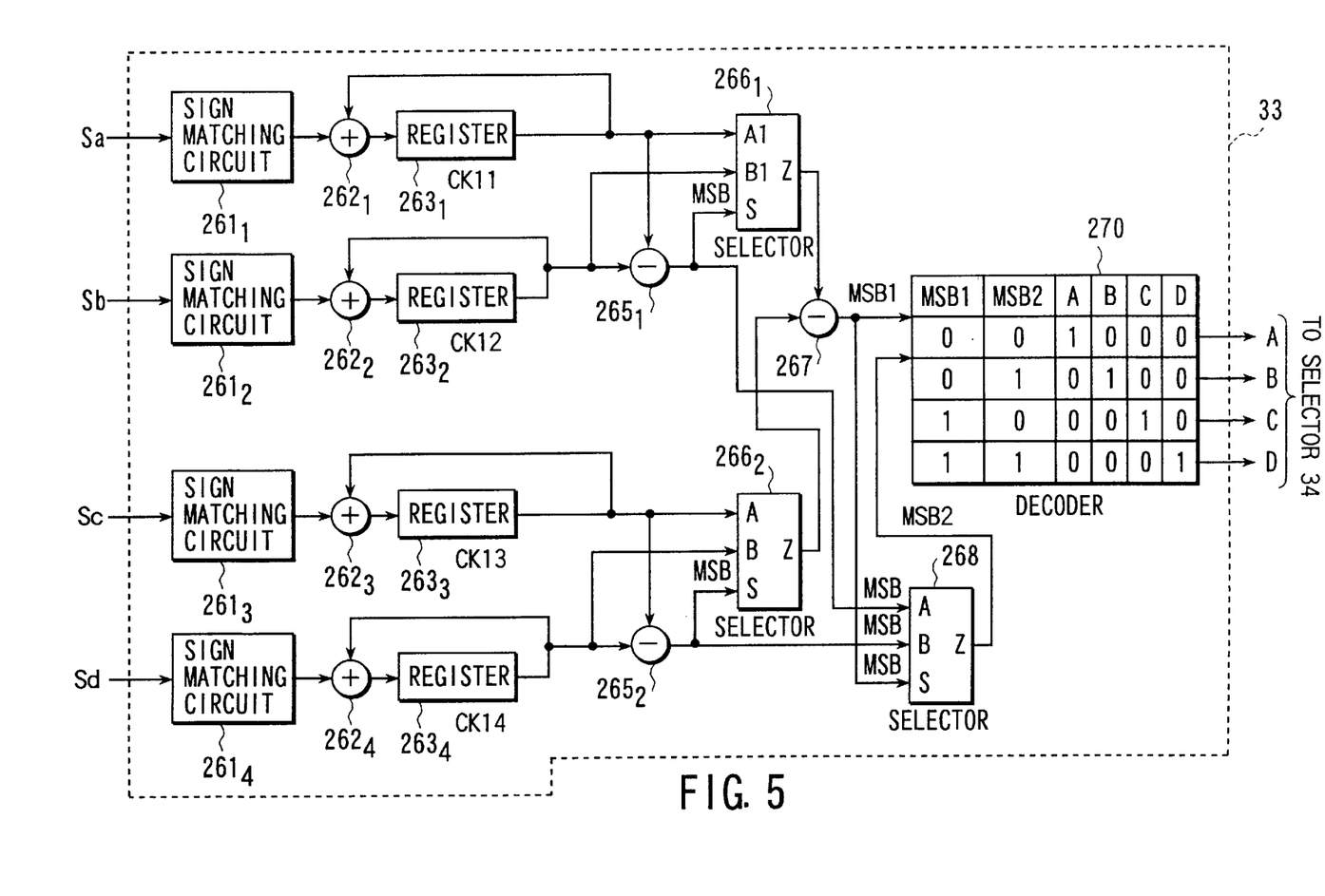
FIG. 5 is a block diagram of a level determination circuit used in the second embodiment.

The level determination circuit 33 is constructed as shown by FIG. 5. In other words, the digital data from the A/D converter 11 is input to sign matching circuits $251_1$, $261_2$, $261_3$ and $261_4$ via the FC detectors $32_1$, $32_2$, $32_3$ and $32_4$. Each of sign matching circuits $261_1$ to $261_4$ has a function of matching the signs of the digital signals by manipulating the most significant bit of the digital signal output from the A/D converter 11. More specifically, the positive and negative signs of the digital signal are matched to either one of the positive or negative by changing the most significant bit. In this time, the sampling number of the A/D converter 11 is assumed to be set to four samples per one bit, i.e., four samples Sa, Sb, Sc and Sd obtained by sampling a waveform representing a bit at four sampling points. In other words, the A/D converter 11 outputs the samples Sa and Sb to the sign matching circuit $261_1$ and $261_2$, respectively. Similarly, the samples Sc and Sd are input to circuits $261_3$ and $261_4$, respectively. The signs of the samples Sa to Sb are matched in each of the sign matching circuits $261_1$ to $261_4$.

The sample data Sa and Sb from the sign matching circuit $261_1$ and $261_2$ are input to registers $263_1$ and $263_2$ via adders $262_1$ and $262_2$, respectively. The sample data Sa and Sb are stored in the resisters $263_1$ and $263_2$ in synchronism with the clock signals CK11 and CK12, respectively. Similarly, the sample data Sc and Sd from the sign matching circuits $261_3$ and $261_4$ are input to resisters $263_3$ and $263_4$ via adders $262_3$ and $262_4$, respectively. The sample data Sc and Sd are stored in resisters $263_3$ and $263_4$ in synchronism with the clock signals CK3 and CK4. The adder $262_1$ accumulates samples Sa corresponding to the bits of the FC signal, i.e., bits, i.e., 11100100. Similarly, each of the adders $262_2$ to $262_4$ accumulates corresponding ones of the samples Sb to Sd corresponding to the bits of the FC signal.

A subtracter $265_1$ performs a subtraction between sample data Sa and Sb stored in the registers $263_1$ and $263_2$ and outputs a level determination signal according to the magnitude relation of the levels of the sample data Sa and Sb. Similarly, a subtracter $265_2$ performs a subtraction between sample data Sc and Sd stored in the registers $263_3$ and $263_4$ and outputs a level determination signal according to the magnitude relation of the levels of the data Sc and Sd.

The level determination signals from the subtracters $265_1$ and $265_2$ are input to the sample data selectors $266_1$ and $266_2$, respectively. The selector $266_1$ selects one of the sample data A1 and B1 that has a higher level. Similarly, The selector $266_2$ selects one of the sample data A2 and B2 that has a higher level. One of sample data A1 and B1 and one of sample data A2 and B2 which are selected by the selectors $266_1$ and $266_2$ are input to a subtracter 267 to perform a subtraction between the selected one of the sample data A1 and B1 and one of the sample data A2 and B2. The subtracter 267 outputs the most significant bit MSB of the sample data as the level determination signal.

When the level determination signal is input to a selector 268, the selector 268 selects one of the output signals from the subtracters 265 and $265_2$. The outputs MSB1 and MSB2 of the subtracter 267 and selector 268 are input to the decoder 270. This decoder 270 outputs a maximum level determination signal in accordance with the signals MSB1 and MSB2 as shown by the table of the decoder 270. When the maximum level determination signal is input to the selector 34, the clock signal corresponding to the highest level is selected by the selector 34 and output as the data reproduction clock signal.

As described above, the maximum level series determination circuit 33 determines the relation of magnitude between sample data Sa to Sd input via the FC detection circuits $32_1$ to $32_4$, determines a series corresponding to the highest level as a series in which the FC detection frequency is highest and outputs the "H" level for the series, for example, and outputs the "L" level for the remaining series.

The clock selection circuit 34 is constructed by a combination of logic circuits such as AND gates and OR gates to receive coincidence determination outputs DET11 to DET14 from the FC detection circuits $32_1$ to $32_4$ and the determination outputs from the maximum level series determination circuit 33, select a clock signal for a series which is one of the series corresponding to the 4-phase clock signals CK11 to CK14 from the clock generator 31 and in which the FC detection frequency is highest, and output the selected clock signal as a data reproduction clock.

Figure 6:
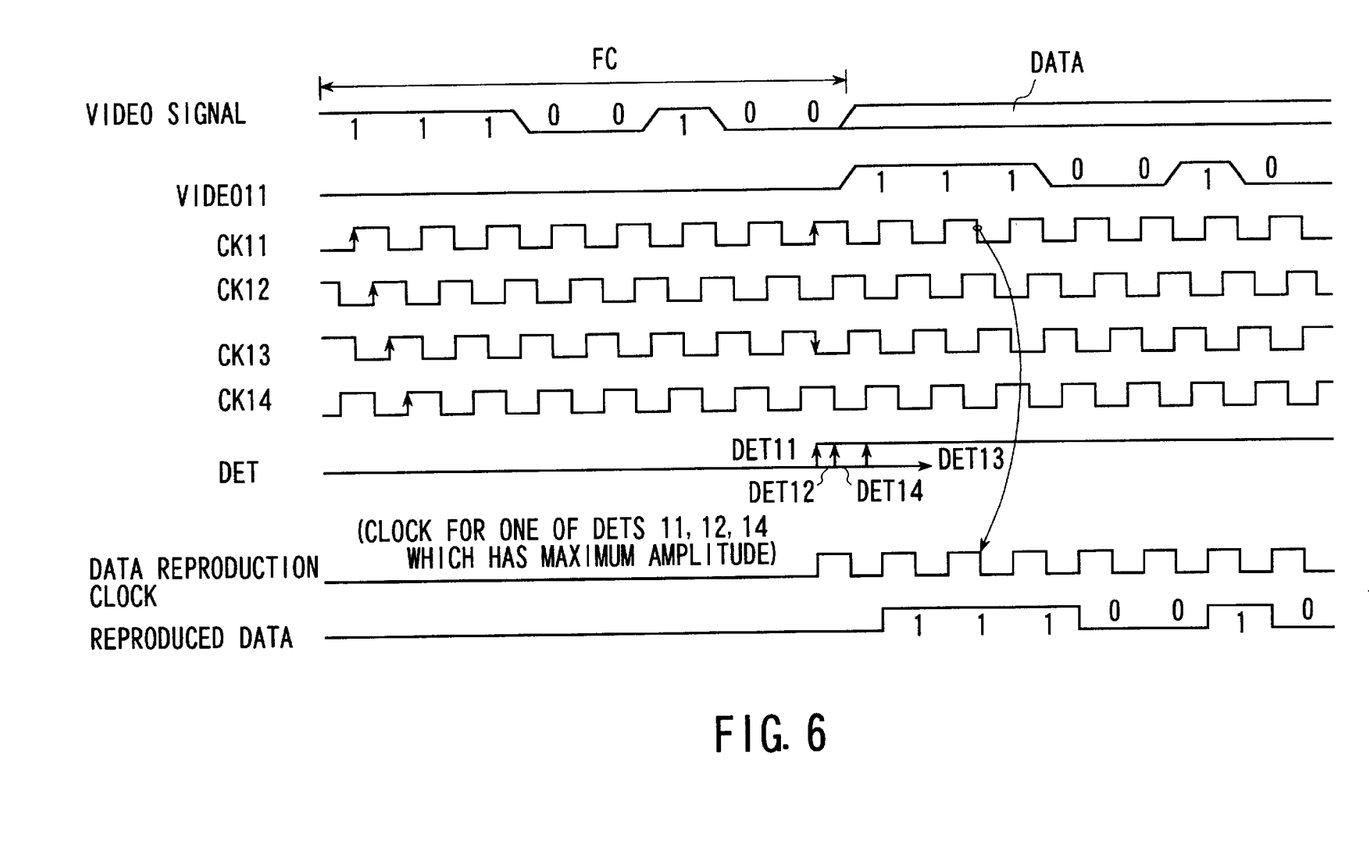
FIG. 6 is a timing waveform diagram for illustrating the operation of the data reproduction apparatus of FIG. 4.

According to the data reproduction apparatus according to the second embodiment, basically the same operation as that of the data reproduction apparatus according to the first embodiment is effected and substantially the same effect as that described before can be attained. Further, since the numbers of clock signals and FC detection circuits used are larger than those in the data reproduction apparatus according to the first embodiment, a clock signal having more suitable phase can be selected to reproduce data. That is, according to the second embodiment, as indicated by the timing chart of FIG. 6, the last bit of the FC signal contained in the video signal is detected at the rise time of the clocks CK11, CK12, CK13 and CK14 and the FC detection circuits $32_1$ to $32_4$ output the detection signals DET11 to DET14 to the clock selector 34. The maximum level series determination circuit 33 determines a signal of maximum amplitude among the sample data of the digital signal output from the A/D converter 11, and outputs an "H" level signal for the series corresponding to the highest level to the clock selection circuit 34. As a result, as shown in FIG. 6, a clock signal of the series corresponding to the highest level is output as a data reproduction clock and supplied to the data reproducing circuit 13.

In the data reproduction apparatus according to the second embodiment, data reproduction can be effected by use of a clock signal having the most suitable phase by further increasing the numbers of clock signals and FC detection circuits.

Figure 7:
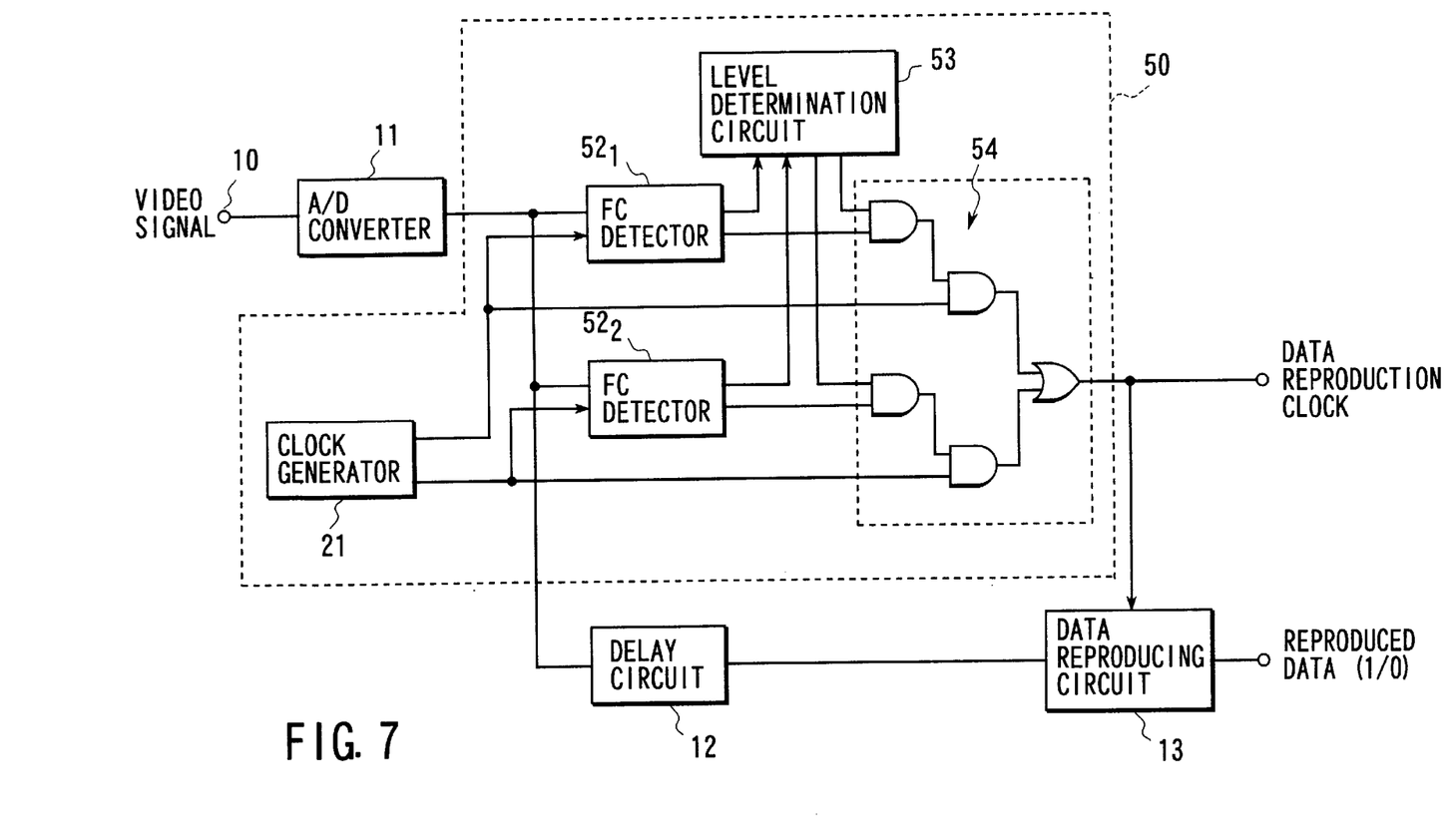
FIG. 7 is a block diagram showing a data reproduction apparatus for character multiplexing video signal according to a third embodiment of this invention.

A data reproduction apparatus for character multiplexing video signal according to a third embodiment is explained with reference to FIG. 7. The data reproduction apparatus shown in FIG. 7 is similar to the data reproduction apparatus shown in FIG. 1 except an FC detecting/clock generating circuit 50 and portions which are the same as those of FIG. 1 are denoted by the same reference numerals used in FIG. 1.

The FC detecting/clock generating circuit 50 is similar to the FC detecting/clock generating circuit 20 shown in FIG. 1 except the constructions of two FC detection circuits $52_1$ and $52_2$ and clock selection circuit 54 and that a level determination circuit 53 is additionally provided, and portions which are the same as those of FIG. 1 are denoted by the same reference numerals used in FIG. 1.

Each of the two FC detection circuits $52_1$ and $52_2$ is constructed by a decoder circuit for detecting an FC signal (eight pulse signals having a pattern of "11100100") contained in the input digital video signal. In one concrete example, each of the FC detection circuits $52_1$ and $52_2$ includes a serial/parallel converter 24 for fetching an input digital video signal in synchronism with the clock signals as shown in FIG. 2 and subjecting the fetched video signal to serial/parallel conversion, a decoder circuit 25 for outputting the result of determination of an "H/L" level, for example, according to whether or not the pattern of the parallel conversion signal of the serial/parallel converter coincides with the reference patterns of the FC signal as shown in FIG. 2.

Figure 8:
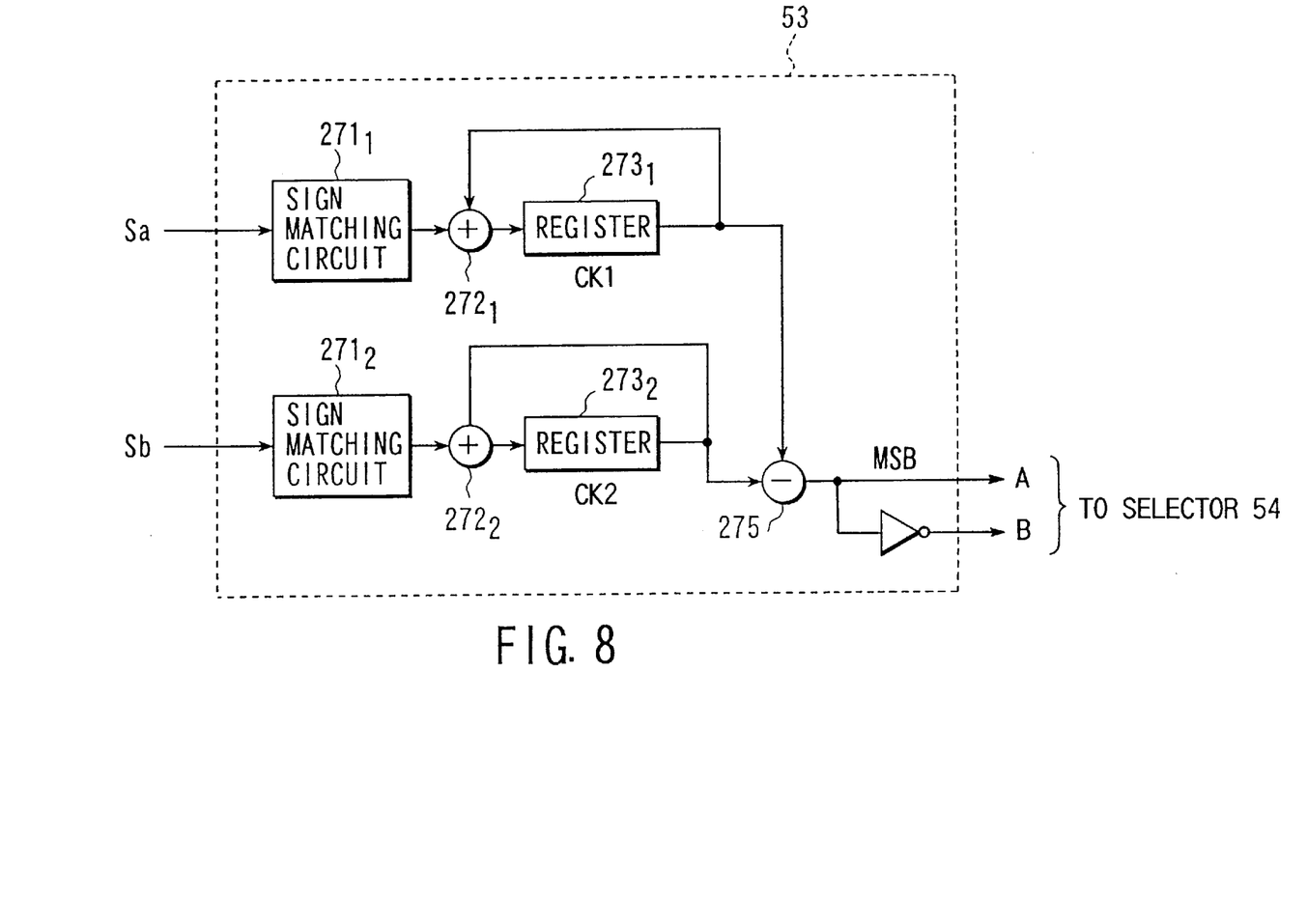
FIG. 8 is a block diagram of a level determination circuit used in the third embodiment.

The level determination circuit 53 is constructed as shown in FIG. 8. In other words, the digital signal output from the A/D converter 11 is input to sign matching circuits $271_1$ and $271_2$. The sign matching circuits $271_1$ and $271_2$ have the same function as that of the sign matching circuit $261_1$ to $261_4$. The sign matching circuits $271_1$ and $271_2$ output sample data Sa and Sb to registers $273_1$ and $273_2$ via adders $272_1$ and $272_2$, respectively. The sample data Sa and Sb are stored in the registers $273_1$ and $273_2$ in synchronism with the clock signals CK1 and CK2, respectively. The adder $272_1$ accumulates samples Sa corresponding to the bits of the FC signal, i.e., bits, i.e., 11100100. Similarly, the adder $272_2$ accumulates samples Sb corresponding to the bits of the FC signal. The sample data Sa read out from the register $273_1$ is input to the subtracter 275. This subtracter 275 performs a subtraction between the sample data Sa and Sb read out from the registers $273_1$ and $273_2$ and outputs a level determination signal (A, B) according to the magnitude relation between the levels of the sample data Sa and Sb to the clock selector 54.

This clock selector 54 selects the clock signal corresponding to the sample data having the larger level in accordance with the level determination signal and outputs it as the data reproducing clock.

As described above, the level determination circuit 53 determines one of the sampling clock series corresponding to a higher level one among the two samples from the A/D converter 11, and outputs the "H" level for the series, for example, and outputs the "L" level for the remaining series.

The clock selection circuit 54 is constructed by a combination of logic circuits such as AND gates and OR gates to receive coincidence determination outputs from the two FC detection circuits $52_1$ and $52_2$ and the level determination signal from the level determination circuit 53, select a clock signal for a series which is one of the series corresponding to the clock signals set in the opposite phase from the clock generator 21 and in which the FC detection frequency is higher, and output the selected clock signal as a data reproduction clock.

Also, according to the data reproduction apparatus according to the third embodiment, basically the same operation as that of the data reproduction apparatus according to the first embodiment is effected and substantially the same effect as that described before can be attained.

As described above, it is possible to provide a data reproduction apparatus for character multiplexing video signal which can stably generate a clock signal for character data reproduction and stably reproduce character data without receiving a substantial influence by the conditions of the countries or regions giving the character multiplexing television broadcast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A data reproduction apparatus for character multiplexing video signal comprising:

an A/D converter circuit for converting a character multiplexing video signal into a digital video signal;

a framing code detecting/clock generating circuit for receiving the digital video signal from said A/D converter circuit and detecting a framing code signal contained in the received signal to generate a clock signal for character data reproduction;

a delay circuit for delaying the digital video signal input from said A/D converter circuit by a period of time corresponding to time required for said framing code detecting/clock generating circuit to generate the clock signal; and a data reproducing circuit for reproducing character data by sampling the digital video signal delayed by said delay circuit in synchronism with the clock signal generated from said framing code detecting/clock generating circuit.

2. A data reproduction apparatus according to claim 1, wherein said A/D converter circuit subjects the character multiplexing video signal obtained by deriving a video signal output from a video signal system in a television receiver to A/D conversion.

3. A data reproduction apparatus according to claim 1, wherein said framing code detecting/clock generating circuit includes a clock generating circuit for generating first and second clock signals of opposite phases each having a frequency which is twice the bit rate of data contained in the digital video signal; two framing code detection circuits for receiving the digital video signal and detecting framing codes in synchronism with the first and second clock signals; and a clock selection circuit for selecting a clock signal input to one of said framing code detection circuits which has first detected a framing code signal as a data reproduction clock.

4. A data reproduction apparatus according to claim 3, wherein each of said two framing code detection circuits fetches the framing code signal in response to one of the rise and fall of a corresponding one of the clock signals of opposite phases and said clock selection circuit selects a clock signal input to one of said framing code detection circuits which has first fetched the framing code signal as a data reproduction clock.

5. A data reproduction apparatus according to claim 4, wherein each of said framing code detection circuits includes a serial/parallel conversion circuit for fetching the digital video signal in synchronism with the clock signal and subjecting the fetched video signal to serial/parallel conversion; and a decoder circuit for outputting a determination signal according to whether or not a pattern of the parallel conversion signal from said serial/parallel conversion circuit coincides with a pattern of a framing code signal used as a reference.

6. A data reproduction apparatus according to claim 3, wherein said A/D converter circuit subjects the character multiplexing video signal obtained by deriving a video signal output from a video signal system in a television receiver to A/D conversion.

7. A data reproduction apparatus according to claim 1, wherein said framing code detecting/clock generating circuit includes a clock generating circuit for generating plural-phase clock signals of at least three phases each having a frequency twice the bit rate of data contained in the digital video signal; a plurality of framing code detection circuits for detecting framing code signals from the digital video signal and outputting the amplitude levels of the framing signals in synchronism with the respective plural-phase clock signals; a maximum level series determination circuit for determining the magnitude relation between the amplitude levels output from said plurality of framing code detection circuits and outputting different logic levels for one of a plurality of series in which the input has the highest level and the framing code detection frequency is highest and the other series; and a clock selection circuit for receiving outputs of said plurality of framing code detection circuits and outputs of plural series from said maximum level series determination circuit and outputting a clock signal of one of the plural series corresponding to the plural-phase clock signals of said clock generating circuit in which the framing code detection frequency is highest as a data reproduction clock.

8. A data reproduction apparatus according to claim 7, wherein said A/D converter circuit subjects the character multiplexing video signal obtained by deriving a video signal output from a video signal system in a television receiver to A/D conversion.

9. A data reproduction apparatus according to claim 7, wherein said clock generating circuit outputs 4-phase clock signals whose phases are sequentially shifted by 90°.

10. A data reproduction apparatus according to claim 9, wherein each of said plurality of framing code detection circuits includes a serial/parallel conversion circuit for fetching the digital video signal in synchronism with a corresponding one of the clock signals which correspond to the 4-phase clock signals and subjecting the fetched video signal to serial/parallel conversion; a decoder circuit for outputting a determination signal according to whether or not a pattern of the parallel conversion signal from said serial/parallel conversion circuit coincides with a pattern of a framing code signal used as a reference; and a level detection circuit for detecting the amplitude level of the digital video signal at the rise timing of the clock signal and outputting the detected level.

11. A data reproduction apparatus according to claim 1, wherein said framing code detecting/clock generating circuit includes a clock generating circuit for generating first and second clock signals of opposite phases each having a frequency twice the bit rate of data contained in the digital video signal; two framing code detection circuits for detecting framing code signals from the digital video signal in synchronism with the first and second clock signals, respectively, outputting first and second framing code detection signals and outputting the amplitude levels of the framing signals at timings of the clock signals corresponding to the first and second framing code detection signals; a level determination circuit for determining the magnitude relation between the amplitude levels output from said two framing code detection circuits and outputting different logic levels corresponding to the magnitude levels; and a clock selection circuit for receiving detection signals from said two framing code detection circuits and the logic levels from said level determination circuit, selecting a clock signal which is one of the clock signals of opposite phases from said clock generating circuit and which corresponds to a higher framing code detection frequency and outputting the selected clock signal as a data reproduction clock.

12. A data reproduction apparatus according to claim 11, wherein said A/D converter circuit subjects the character multiplexing video signal obtained by deriving a video signal output from a video signal system in a television receiver to A/D conversion.

13. A data reproduction apparatus according to claim 11, wherein each of said framing code detection circuits includes a serial/parallel conversion circuit for fetching the digital video signal in synchronism with a corresponding one of the clock signals of opposite phases and subjecting the fetched video signal to serial/parallel conversion; a decoder circuit for outputting a determination signal according to whether or not a pattern of the parallel conversion signal from said serial/parallel conversion circuit coincides with a pattern of a framing code signal used as a reference; and a level detection circuit for detecting the amplitude level of the digital video signal at the rise timing of the clock signal and outputting the detected level.

\* \* \* \* \*